US012431656B2

(12) United States Patent
Valdes et al.

(10) Patent No.: US 12,431,656 B2
(45) Date of Patent: Sep. 30, 2025

(54) ELECTRICAL CONNECTOR ASSEMBLY

(71) Applicant: Aptiv Technologies AG, Schaffhausen (CH)

(72) Inventors: Arturo Casares Valdes, Saltillo (MX); Duane Brantingham, Cortland, OH (US); Eduardo Daniel Alvarez Valdez, Saltillo (MX); Velmurugan Kandasamy, Salem (IN)

(73) Assignee: APTIV TECHNOLOGIES AG, Schaffhausen (CH)

( * ) Notice: Subject to any disclaimer, the term of this patent is extended or adjusted under 35 U.S.C. 154(b) by 519 days.

(21) Appl. No.: 17/973,842

(22) Filed: Oct. 26, 2022

(65) Prior Publication Data

US 2024/0145976 A1 May 2, 2024

(51) Int. Cl.
*H01R 13/436* (2006.01)
*H01R 13/502* (2006.01)
(Continued)

(52) U.S. Cl.
CPC ......... *H01R 13/436* (2013.01); *H01R 13/502* (2013.01); *H01R 13/516* (2013.01); *H01R 13/64* (2013.01); *H01R 24/40* (2013.01)

(58) Field of Classification Search
CPC .. H01R 13/436; H01R 13/502; H01R 13/516; H01R 13/64; H01R 24/40;
(Continued)

(56) References Cited

U.S. PATENT DOCUMENTS 6,824,406 B1 11/2004 Sharples et al.
7,086,908 B2 * 8/2006 Fukuzaki ............... H01R 13/42
439/669

(Continued)

FOREIGN PATENT DOCUMENTS

EP 1361629 A2 11/2003
EP 1361629 A3 8/2004

OTHER PUBLICATIONS

MATE-AX, 1Pos,90Deg,Socket Hsg,Assy; Drawing No. C2343137, Nov. 6, 2019, TE Connectivity, 2 pages.

(Continued)

*Primary Examiner* — Abdullah A Riyami
*Assistant Examiner* — Nader J Alhawamdeh
(74) *Attorney, Agent, or Firm* — Billion & Armitage

(57) ABSTRACT

An electrical connector assembly includes several electrical terminals. Each electrical terminal has a connection portion extending along a first axis and an attachment portion extending along a second axis substantially perpendicular to the first axis. The electrical connector assembly further includes a connector housing having terminal cavities in which the electrical terminals are disposed and a wire dress cover slidably attached to the connector housing. The wire dress cover is moveable in a direction substantially parallel to the second axis from a pre-staged position to a staged position. The wire dress cover defines a locking feature to secure the electrical terminals within the terminal cavities when in the staged position and to inhibit movement of the wire dress cover from the pre-staged position to the staged position when one of the electrical terminals is in an unseated condition within one of the terminal cavities.

18 Claims, 8 Drawing Sheets

(51) Int. Cl.
*H01R 13/516* (2006.01)
*H01R 13/64* (2006.01)
*H01R 24/40* (2011.01)

(58) Field of Classification Search
CPC ............ H01R 13/4223; H01R 13/4361; H01R 13/562; H01R 13/4368; H01R 13/72; H01R 13/40
See application file for complete search history.

(56) References Cited

U.S. PATENT DOCUMENTS

2005/0181664 A1* 8/2005 Fukuzaki ............... H01R 13/42 439/694
2022/0094093 A1* 3/2022 Peterson ............... G01S 13/931
2022/0200189 A1* 6/2022 Sundarakrishnamachari .............. H01R 13/424
2023/0253735 A1* 8/2023 Sundarakrishnamachari .............. H01R 13/4223 439/304
2024/0088611 A1* 3/2024 Valdes ................. H01R 13/213
2024/0145976 A1* 5/2024 Valdes ............... H01R 13/4361

OTHER PUBLICATIONS

MATE-AX,4Pos,Soc HSG,90Deg,Uns; Drawing No. C2343139, Mar. 30, 2021, TE Connectivity, 2 pages.
MATE-AX, 90Deg, 2Pos Socket Housing, Sub-Assy; Drawing No. C2357600, May 5, 2019, TE Connectivity, 2 pages.
MATE-AX, 90Deg, 3Pos Socket Housing, Sub-Assy; Drawing No. C2357601, ; May 5, 2019, TE Connectivity, 2 pages.
“Extended European Search Report”, European Patent Office, Mailed on Feb. 2, 2024, 10 pages.

* cited by examiner

ELECTRICAL CONNECTOR ASSEMBLY

BACKGROUND

An independent secondary lock (ISL) is a component that may be installed into an electrical connector after the terminals are inserted into the connector housing to ensure that terminals are properly positioned and seated within the terminal cavities in the connector housing. The ISL provides redundant terminal locking features to maintain proper seating of the terminals within the cavities even if a primary terminal locking feature in the connector housing fails or is not present. The ISL may also provide detection of improperly seated terminals by being blocked from being properly connected to the connector housing.

A wire dress cover (WDC) is another component of an electrical connector, usually provided separately from the connector housing, which ensures that electrical wire cables attached to the terminals are neatly and properly arranged. The WDC is typically installed after the electrical terminals are inserted into the connector housing. In addition to assuring proper arrangement of the electrical wire cables, the WDC may also provide wire cable containment, cable strain relief, and an additional push surface. On sealed electrical connectors, the WDC may also provide additional protection against liquid intrusion into the connector housing.

In some existing electrical connectors, the ISL features are provided by two separate ISL devices, one for two separate sets of terminals. These electrical connectors are provided with the ISL devices in a pre-staged position and the ISL devices are moved to a staged position after electrical terminals are inserted within the connector housing. This configuration may have push surfaces and pre-staged/staged locking features on the ISL devices that are very small, resulting in poor visual and tactile feedback as the ISL devices move from the pre-staged to the staged position. Some existing electrical connectors also lack wire dress covers. The lack of a WDC may expose terminals to damage and make compliance with ergonomic push surface requirements for automotive standards more difficult.

SUMMARY

According to one or more aspects of the present disclosure, an electrical connector assembly includes a plurality of electrical terminals. Each electrical terminal in the plurality of electrical terminals has a connection portion that extends along a first axis and an attachment portion that extend along a second axis which is substantially perpendicular to the first axis. The electrical connector assembly also includes a connector housing having a plurality of terminal cavities in which the plurality of electrical terminals are disposed, and a wire dress cover slidably attached to the connector housing. The wire dress cover is moveable in a direction substantially parallel to the second axis from a pre-staged position to a staged position. The wire dress cover defines a locking feature that is configured to secure the plurality of electrical terminals within the plurality of terminal cavities when in the staged position. The wire dress cover is further configured to inhibit movement of the wire dress cover from the pre-staged position to the staged position when one of the plurality of electrical terminals is in an unseated condition within one of the plurality of terminal cavities.

According to one or more aspects of the present disclosure, a method of assembling an electrical connector having a wire dress cover includes the steps of a) inserting a plurality of electrical terminals within a plurality of terminal cavities of a connector housing. Each electrical terminal of the plurality of electrical terminals has a connection portion extending along a first axis and an attachment portion extending along a second axis substantially perpendicular to the first axis;
b) placing the wire dress cover in a pre-staged position; and
c) moving the wire dress cover in a direction parallel to the second axis from the pre-staged position to a staged position, thereby inserting a locking feature defined by the wire dress cover between the attachment portions of the plurality of electrical terminals.

BRIEF DESCRIPTION OF THE DRAWINGS

The present invention will now be described, by way of example, with reference to the accompanying drawings, in which.

DETAILED DESCRIPTION

This disclosure is directed to an electrical connector assembly having a movable wire dress cover that also provides an independent secondary lock function for terminals within the connector assembly.

Figure 1:
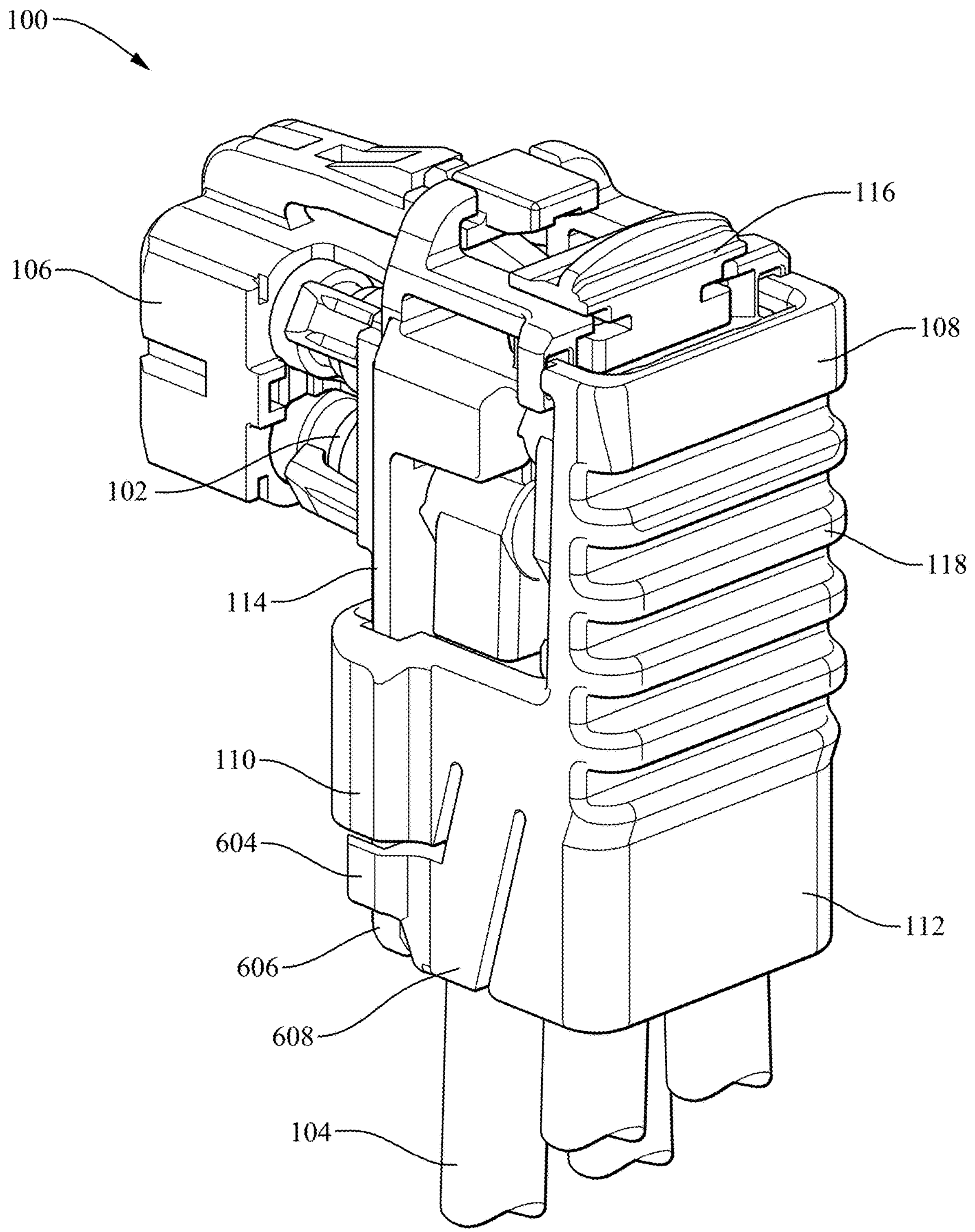
FIG. 1 illustrates an isometric view of an electrical connector assembly having a movable wire dress cover according to some embodiments.

An electrical connector assembly, hereafter referred to as the assembly 100 is presented herein. The assembly 100 is designed to overcome at least some of the deficiencies of previous electrical connector assemblies described above. A non-limiting example embodiment of the assembly 100 is shown in FIG. 1. The assembly 100 includes a plurality of electrical terminals 102 connected to a plurality of electrical cables, in this example coaxial electrical cables 104, disposed within a connector housing 106. Alternative embodiments may be envisioned using other types of electrical cables. As illustrated, the electrical terminals 102 are right-angled miniature coaxial terminals that are each connected to a coaxial electrical cables 104. There are four electrical terminals 102 that are arranged within the connector housing 106 in a 2 by 2 array. Alternative embodiments with different numbers of electrical terminals arranged in other configurations may also be envisioned. The assembly 100 further includes a wire dress cover (WDC 108) that is slidably attached to the connector housing 106. A first function of the WDC 108 is to ensure that the plurality of coaxial electrical cables 104 attached to the electrical terminals 102 are neatly and properly arranged. A second function of the WDC 108 is to provide a locking feature to retain the electrical terminals 102 within the connector housing 106. A third function of the WDC 108 is to provide a terminal position assurance (TPA) feature to detect whether each of the plurality of electrical terminals 102 are properly seated within the connector housing 106 as will be explained below. In the illustrated example, the WDC 108 is slidably attached to the connector housing 106 by a pair of arms 110 that extend from a back wall 112 of the WDC 108. This pair of arms 110 is attached to a tab 114 extending from the connector housing 106. The assembly 100 optionally includes a connector position assurance (CPA) device 116 configured to detect and maintain a proper connection between the assembly 100 and a corresponding mating electrical connector assembly (not shown). Other embodiments using alternative means to slidably attach the WDC 108 to the connector housing may also be envisioned.

Figure 2:
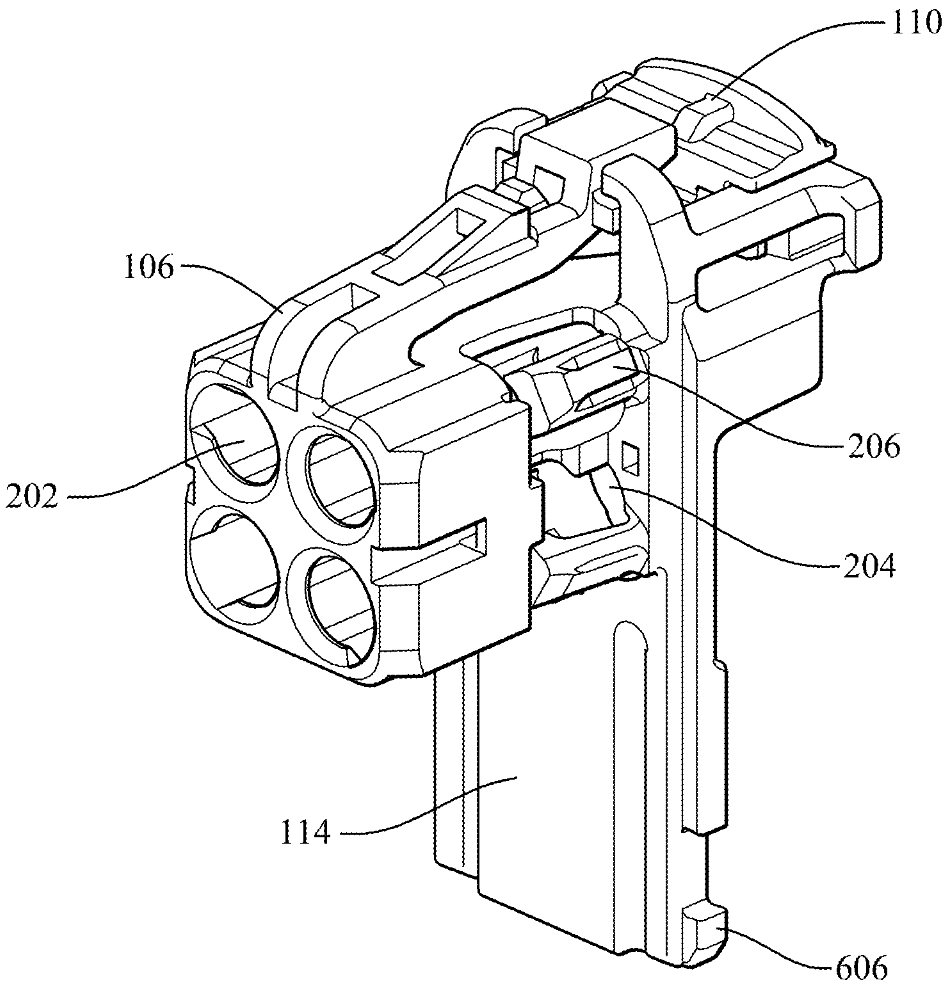
FIG. 2 illustrates an isometric view of a housing of the electrical connector assembly of FIG. 1 according to some embodiments.

FIG. 2 shows an isolated view of the connector housing 106 and CPA device 116. The connector housing 106 defines a plurality of terminal cavities 202 in which the plurality of electrical terminals 102 is received. The plurality of electrical terminals 102 is inserted into the plurality of terminal cavities 202 through a plurality of terminal apertures 204 that are defined by the connector housing 106. The connector housing 106 also defines a plurality of primary terminal locking features 206 in the form of flexible arms that engages and retains the plurality of electrical terminals 102 in a properly seated position within the plurality of terminal cavities 202 after proper insertion within the plurality of terminal cavities 202.

Figure 3:
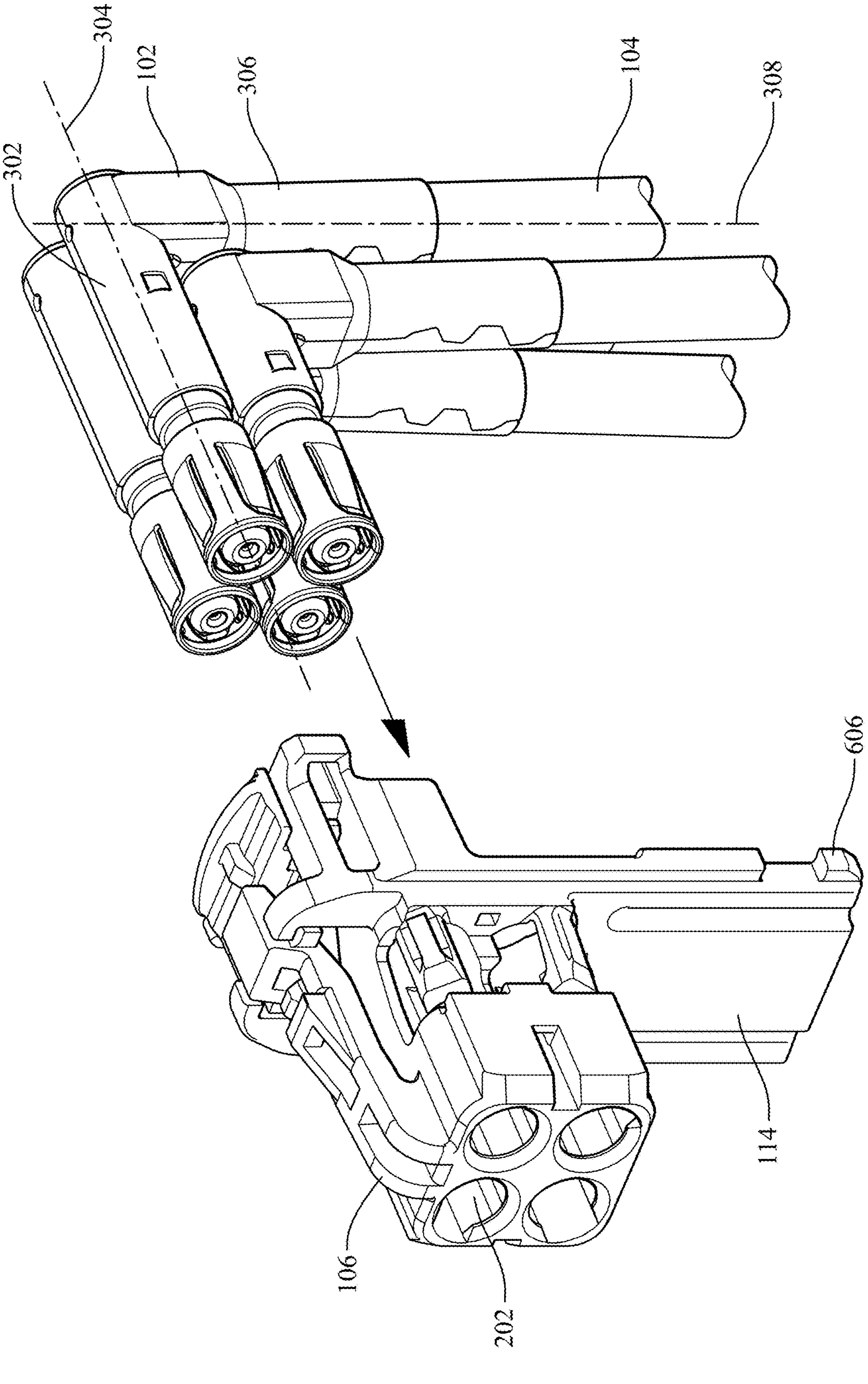
FIG. 3 illustrates an exploded isometric view showing the housing and a plurality of terminals of the electrical connector assembly of FIG. 1 according to some embodiments.

FIG. 3 is an exploded assembly view of connector housing 106, the plurality of electrical terminals 102, and the plurality of coaxial electrical cables 104 illustrating how the plurality of electrical terminals 102 are inserted into the plurality of terminal cavities 202 through the plurality of terminal apertures 204. Since the plurality of electrical terminals 102 are right angled terminals, they each have a connection portion 302 extending along a first axis 304 that is configured to interconnect with a corresponding electrical terminal (not shown) and an attachment portion 306 extending along a second axis 308 that is arranged substantially perpendicular to the first axis 304. As used herein, "substantially perpendicular" means±10° of absolutely perpendicular.

Figure 4:
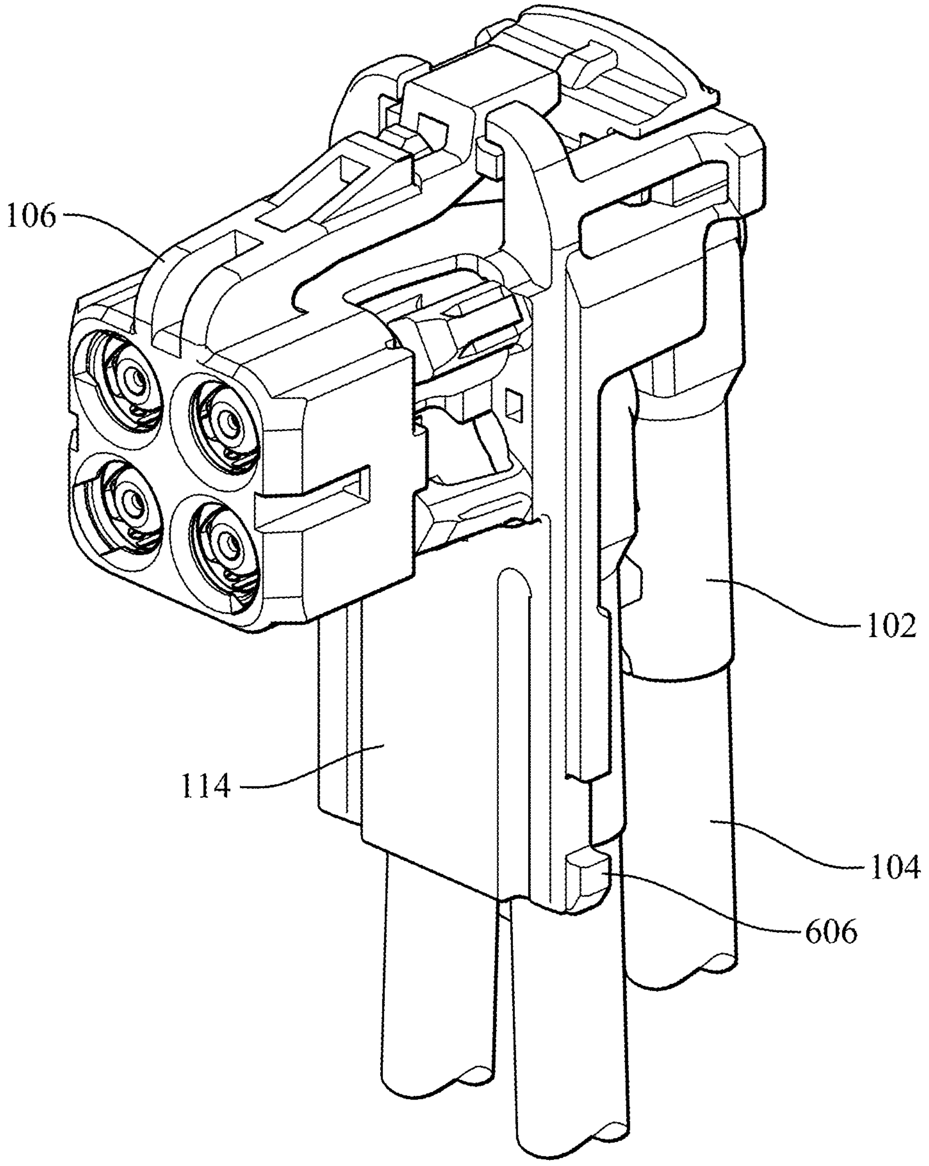
FIG. 4 illustrates a partially assembled isometric view of the electrical connector assembly of FIG. 1 showing the housing and the plurality of terminals according to some embodiments.

FIG. 4 shows the plurality of electrical terminals 102 seated within the plurality of terminal cavities 202 and engaging the plurality of primary terminal locking features 206 prior to attachment of the WDC 108 to the connector housing 106.

Figure 5:
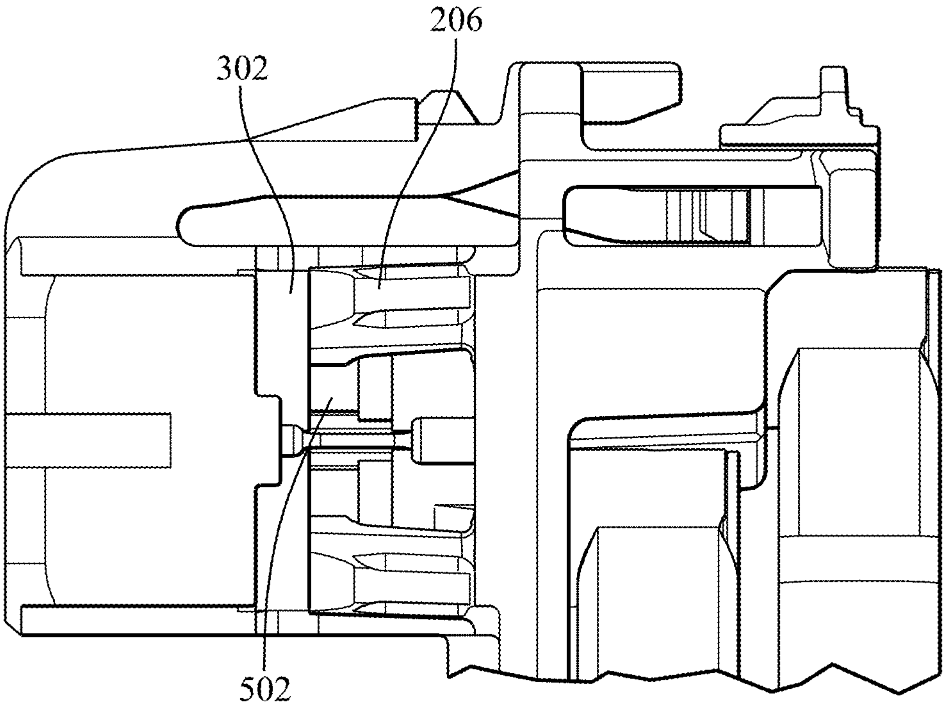
FIG. 5 illustrates a close-up side view of the electrical connector assembly of FIG. 1 showing an interface between the plurality of terminals and primary terminal locking features defined by the housing according to some embodiments.

FIG. 5. shows a close-up view from one side of the plurality of primary terminal locking features 206 engaging terminal retention features 502 in the connection portions 302 of the plurality of electrical terminals 102. This engagement holds the plurality of electrical terminals 102 in the properly seated condition within the plurality of terminal cavities 202.

Figure 6:
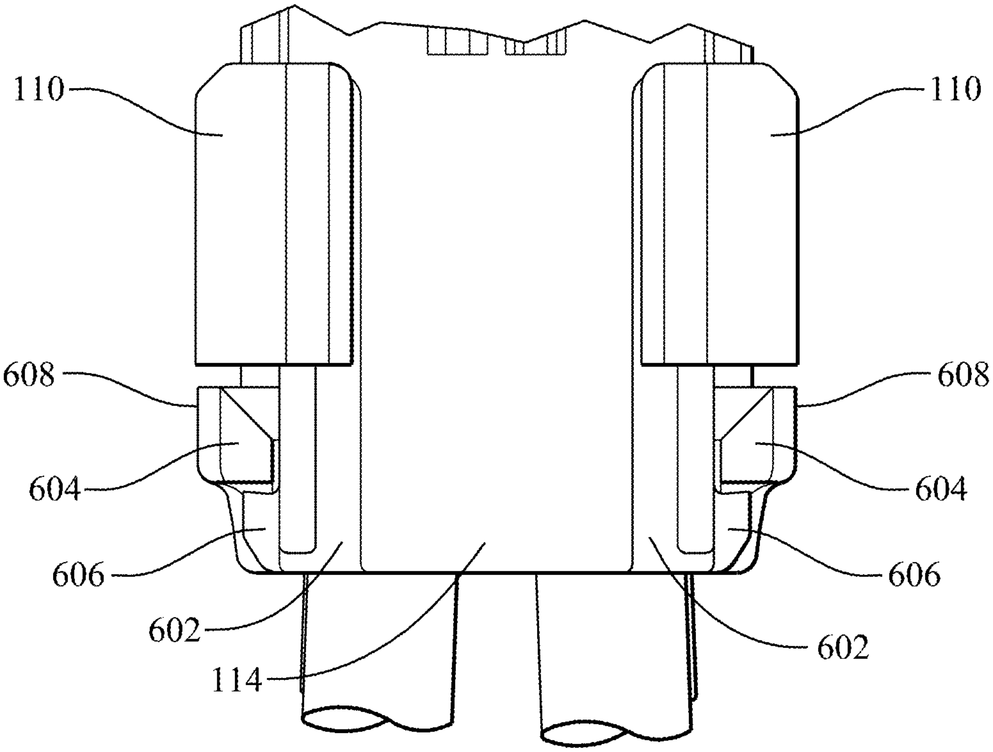
FIG. 6 illustrates a close-up front view of the electrical connector assembly of FIG. 1 showing an interface of locking features of the movable wire dress cover with corresponding locking features of the housing configured to retain the wire dress cover in the staged position according to some embodiments.

FIG. 6 shows a close-up front view of the slidable attachment of the WDC 108 to the connector housing 106. The tab 114 defines a pair of grooves 602 that receive ends of the arms 110 and guide the WDC 108 in a direction that is substantially parallel to the second axis 308. As used herein, "substantially parallel" means±10° of absolutely parallel. Flexible portions of the arms 110 define cantilevered beams 608 having hook features 604 on free ends of the cantilevered beam 608 that are configured to engage with corresponding hook features 606 on the connector housing 106. The hook feature 604 on the cantilevered beam 608 cooperates with the corresponding hook feature 606 on the connector housing 106 to maintain the WDC 108 in a staged position.

Figure 7B:
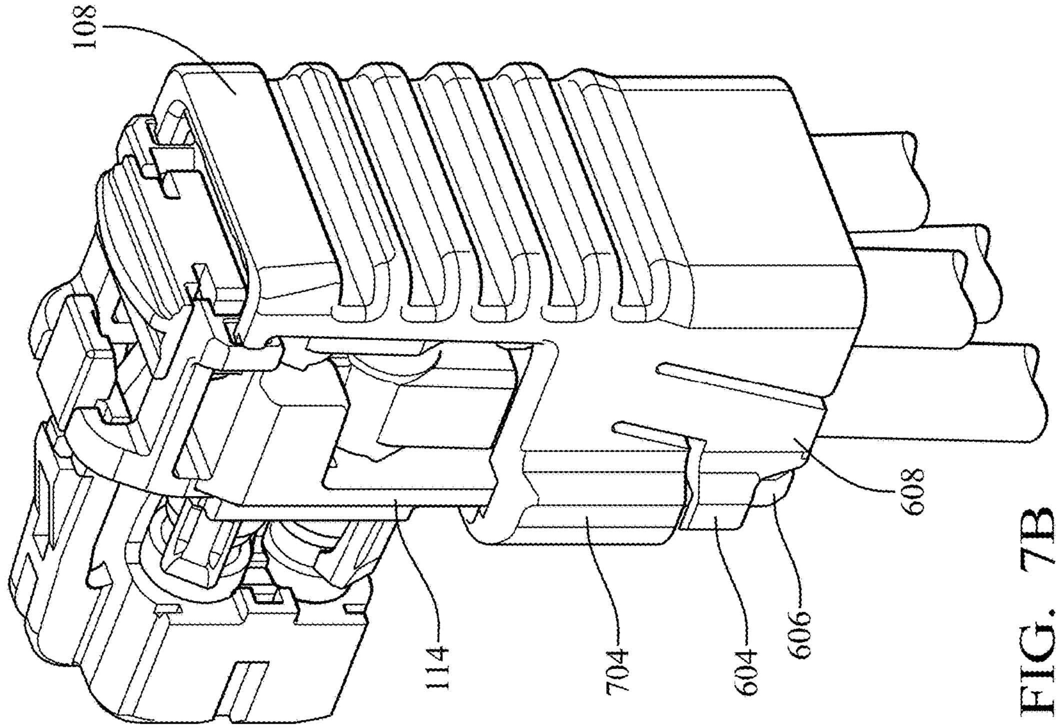
FIG. 7B illustrates an isometric view of the electrical connector assembly of FIG. 1 with the movable wire dress cover in a staged position according to some embodiments.
Figure 7A:
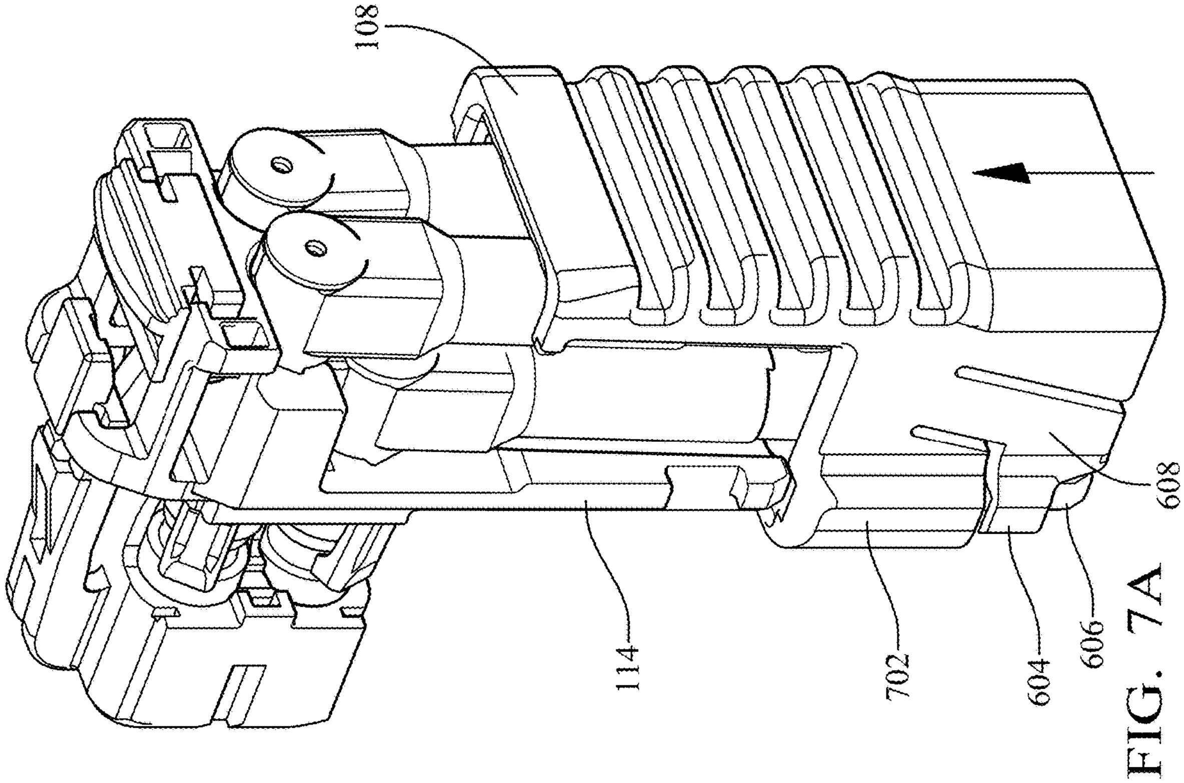
FIG. 7A illustrates an isometric view of the electrical connector assembly of FIG. 1 with the movable wire dress cover in a pre-staged position according to some embodiments.

FIGS. 7A and 7B shows the WDC 108 in a pre-staged position 702 (FIG. 7A) and a staged position 704 (FIG. 7B). The WDC 108 is slid upwardly in a direction parallel to the second axis 308 from the pre-staged position 702 shown in FIG. 7A to the staged position 704 shown in FIG. 7B. The WDC 108 may also be returned from the staged position 704 to the pre-staged position 702 if needed to remove and service a damaged electrical terminal 102.

Figure 8:
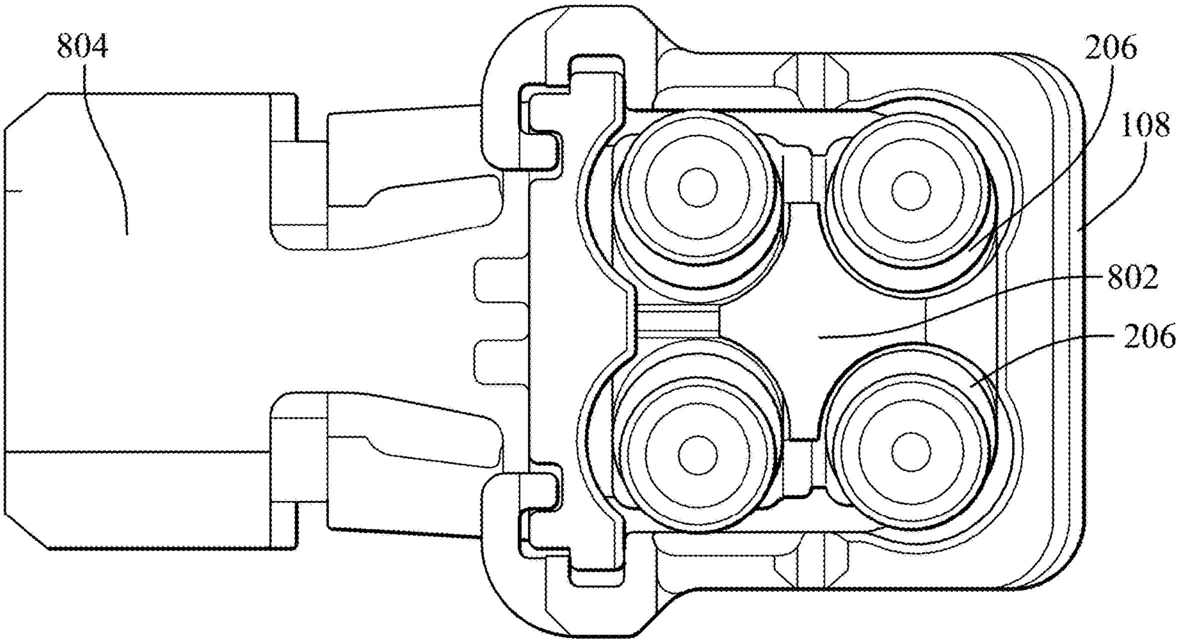
FIG. 8 illustrates a cross-section bottom view of the electrical connector assembly of FIG. 1 with the movable wire dress cover in the staged position according to some embodiments.
Figure 9:
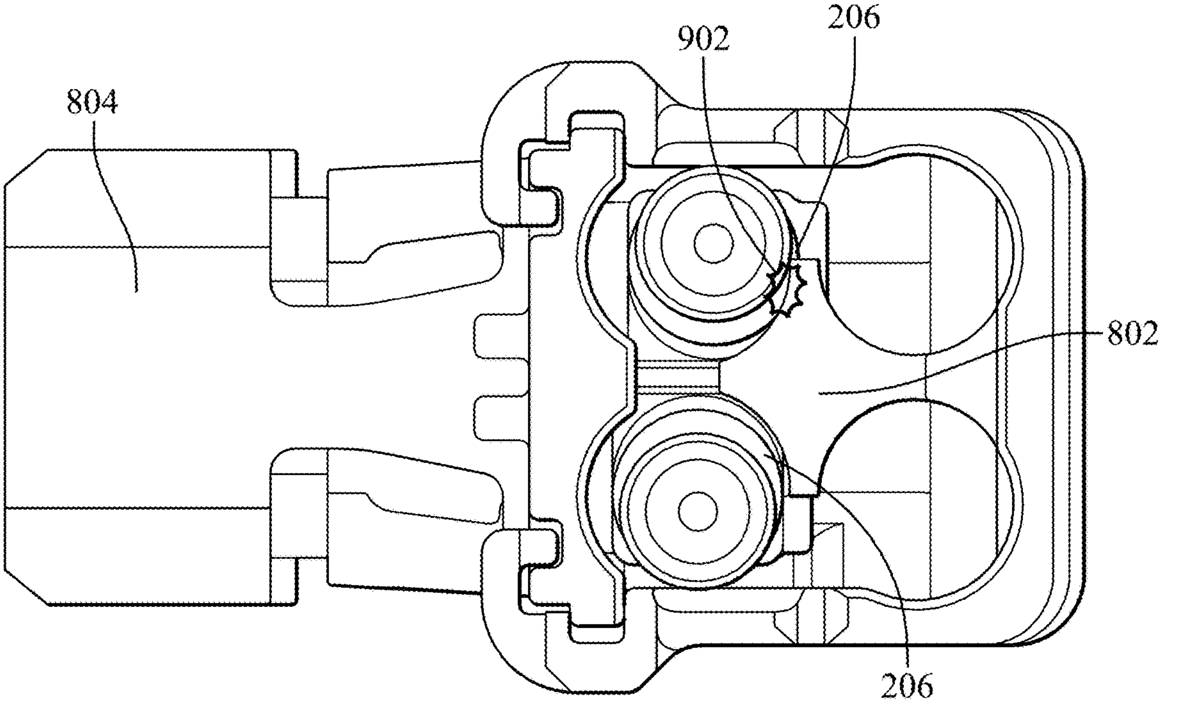
FIG. 9 illustrates a cross-section bottom view of the electrical connector assembly of FIG. 1 with the movable wire dress cover held in the pre-staged position by an interference with one of the plurality of terminal which is not properly seated according to some embodiments.

As shown in the cross section view of the assembly in FIG. 8, the WDC 108 defines a locking feature 802 that is disposed between the attachment portions 306 of the plurality of electrical terminals 102. The locking feature 802 provides a secondary locking feature to the plurality of primary terminal locking features 206. When each of the plurality of electrical terminals 102 is engaged with the plurality of primary terminal locking features 206 and properly seated within the plurality of terminal cavities 202, the position of the attachment portions 306 of the plurality of electrical terminals 102 is such that the WDC 108 is able to be freely moved from the pre-staged position 702 to the staged position 704 without interference between the attachment portions 306 and the locking feature 802. In other words, when each of the plurality of electrical terminals 102 is in the properly seated condition the locking feature 802 is located between the attachment portions 306 when the WDC 108 is in the staged position 704 as shown in FIG. 8. With the locking feature 802 disposed between the attachment portions 306 of the plurality of electrical terminals 102, and the WDC 108 secured to the connector housing 106 by the arms 110 of the WDC 108, the locking feature 802 blocks the plurality of electrical terminals 102 in the seated condition to provide the secondary locking feature. When one of the plurality of electrical terminals 102 is in an unseated condition, perhaps because of a lack of engagement with a primary terminal locking feature 206, the attachment portion 306 of that electrical terminal 102 will be in a position that causes an interference condition 902 with the locking feature 802 as shown in FIG. 9. This interference condition will prevent the WDC 108 from being moved from the pre-staged position 702 to the staged position 704, thereby indicating to a human or automated assembler that one of the plurality of electrical terminals 102 is in an unseated condition and remedial measures should be taken to correct this.

The locking feature 802 also serves as an independent secondary lock and is capable of maintaining the plurality of electrical terminals 102 in the seated condition if one of the plurality of primary terminal locking features 206 were to fail after the WDC 108 has been moved to the staged position 704. With the locking feature 802 disposed between the attachment portions 306 of the plurality of electrical terminals 102, and the WDC 108 secured to the connector housing 106 by the arms 110 of the WDC 108, the locking feature 802 blocks the plurality of electrical terminals 102 in the seated condition to serve as the independent secondary lock.

The locking feature 802 is moved into a location between the attachment portions 306 of the plurality of electrical terminals 102 as the WDC 108 is moved from the pre-staged position 702 to the staged position 704. The locking feature 802 defines a plurality of concave surfaces. When the WDC 108 is in the staged position 704 and the locking feature 802 is disposed between the attachment portions 306 these concave surfaces are located proximately to and are configured to engage a side surface of the attachment portions 306. If the WDC 108 is moved from the staged position 704 to the pre-staged position 702, the locking feature 802 is moved from the location between the attachment portions 306 and the concave surfaces of the locking feature 802 are no longer in a position to engage the attachment portions 306. A leading edge of the locking feature 802 will contact an attachment portion 306 of any one of the plurality of electrical terminals 102 that is not properly seated within its terminal cavity 202, thereby causing mechanical interference that will inhibit movement of the WDC 108 from the pre-staged position 702 to the staged position 704, thereby alerting an assembly operator of an unseated electrical terminal 102.

Further, the back wall 112 of the WDC 108 is textured to increase the coefficient of friction of the back wall 112 to provide an enhanced push surface for moving the WDC 108 from the pre-staged position 702 to the staged position 704. This push surface may also be used for mating the assembly 100 with a corresponding electrical connector assembly 804. In the illustrated example of FIG. 1, the back wall 112 defines a plurality of horizonal ribs 118. In other embodiments, the back wall could define a chevron pattern, an array or bumps or indentations, or any other feature known to provide a textured surface that increases the coefficient of friction of the push surface of the back wall. The plurality of horizonal ribs 118 or the other mentioned features on the back wall 112 of the WDC 108 may also provide an indication to an assembly operator of the location of the push surface.

Figure 10:
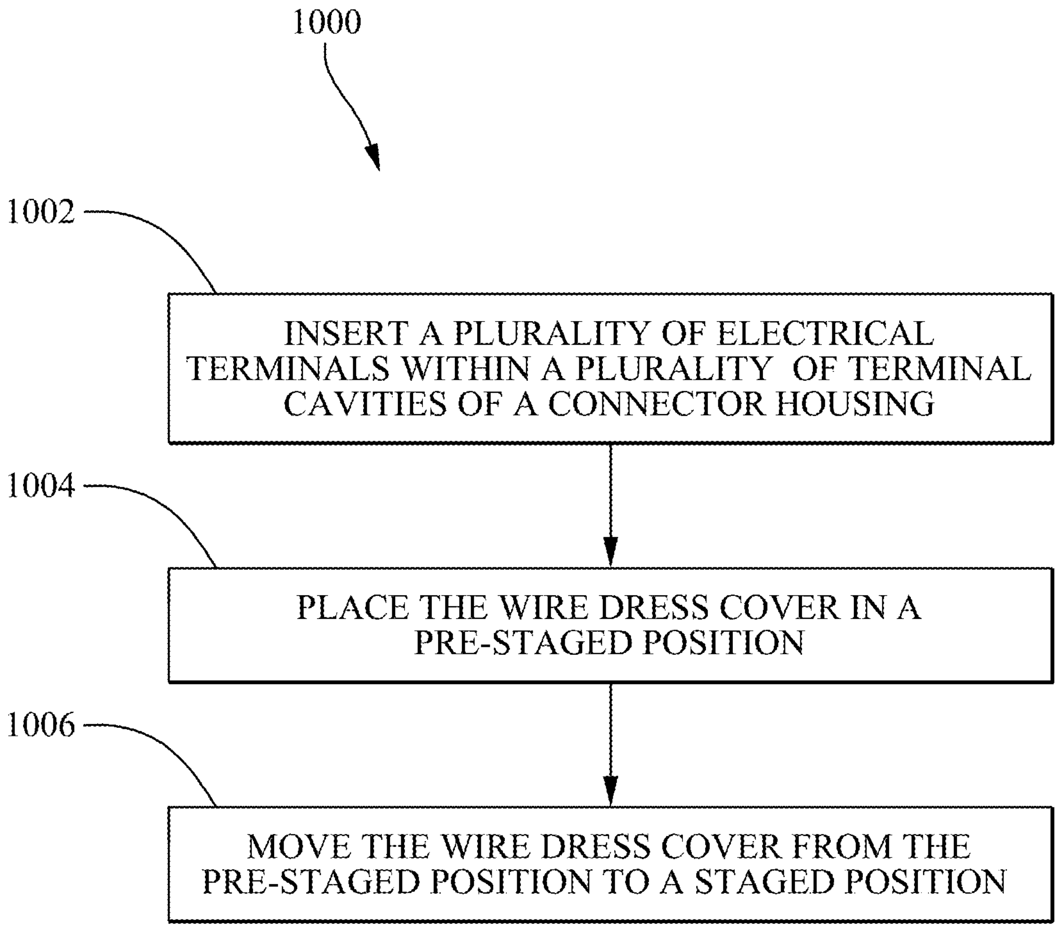
FIG. 10 illustrates flow chart to assembling the electrical connector assembly of FIG. 1 according to some embodiments.

FIG. 10 shows a flow chart of a method 1000 of assembling an electrical connector, such as the assembly 100 illustrated in FIGS. 1-9.

STEP 1002, INSERT A PLURALITY OF ELECTRICAL TERMINALS WITHIN A PLURALITY OF TERMINAL CAVITIES OF A CONNECTOR HOUSING, includes inserting a plurality of electrical terminals 102 within a plurality of terminal cavities 202 of a connector housing 106. Each electrical terminal of the plurality of electrical terminals 102 has a connection portion 302 extending along a first axis 304. Each electrical terminal of the plurality of electrical terminals 102 also has an attachment portion 306 that extends along a second axis 308 which is substantially perpendicular to the first axis 304. Optionally, STEP 1002 also includes engaging a plurality of primary terminal locking features 206 that are defined by the connector housing 106 with the plurality of electrical terminals 102 in order to secure the plurality of electrical terminals 102 within the plurality of terminal cavities 202 in the seated condition;

STEP 1004, PLACE THE WIRE DRESS COVER IN A PRE-STAGED POSITION, includes placing a wire dress cover (WDC) 108 in a pre-staged position 702 on the connector housing 106. This may be accomplished by slidably attaching the WDC 108 to the connector housing 106;

STEP 1006, MOVE THE WIRE DRESS COVER FROM THE PRE-STAGED POSITION TO A STAGED POSITION, includes moving the WDC 108 in a direction substantially parallel to the second axis 308 from the pre-staged position 702 to a staged position 704, thereby inserting a locking feature 802 defined by the WDC 108 between the attachment portions 306 of the plurality of electrical terminals 102. STEP 1006 may be performed by contacting a push surface on the WDC 108 having a plurality of horizontal ribs 118 or other features to increase the coefficient of friction of the push surface. Optionally, STEP 1006 further includes engaging a cover locking feature 604 on the WDC 108 with the corresponding cover locking feature 606 on a tab 114 of the connector housing 106 to maintain the WDC 108 in the staged position 704.

The assembly 100 and method 1000 improves independent secondary lock detection feedback over prior connector assembly designs because the WDC 108 cannot be closed with an unseated terminal and this can be easily detected visually and tactilely. In addition, design of the assembly 100 allows a larger push surface on the WDC 108, thereby providing easier compliance with automotive standards, such the United States Council for Automotive Research's USCAR-25 specification. Further the WDC 108 provides additional protection for plurality of electrical terminals 102. The WDC 108 allows the assembly 100 to meet the mechanical side loads specified in USCAR-25. The assembly 100 provides reduced complexity and assembly time by reducing the number of assembled parts from four in the prior connector designs to two, the connector housing 106 and WDC 108.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment(s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. An electrical connector assembly, comprising:

a plurality of electrical terminals each having a connection portion extending along a first axis and an attachment portion extending along a second axis substantially perpendicular to the first axis; a connector housing having a plurality of terminal cavities in which the plurality of electrical terminals are disposed; and a wire dress cover slidably attached to the connector housing and moveable in a direction substantially parallel to the second axis from a pre-staged position to a staged position, the wire dress cover defines a locking feature configured to secure the plurality of electrical terminals within the plurality of terminal cavities when in the staged position, the locking feature further configured to inhibit movement of the wire dress cover from the pre-staged position to the staged position when one of the plurality of electrical terminals is in an unseated condition within one of the plurality of terminal cavities, the wire dress cover comprises a cantilevered beam and a hook feature on a free end of the cantilevered beam that is configured to engage with a corresponding hook feature on the connector housing, the hook feature on the cantilevered beam cooperates with the corresponding hook feature on the connector housing to maintain the wire dress cover in the staged position and fully secured.

2. The electrical connector assembly in accordance with claim 1, wherein the connector housing defines a plurality of primary locking features configured to secure the plurality of electrical terminals within the plurality of terminal cavities in a seated condition.

3. The electrical connector assembly in accordance with claim 2, wherein the locking feature is a secondary locking feature.

4. The electrical connector assembly in accordance with claim 1, wherein the locking feature defines a plurality of surfaces and wherein each surface is configured to engage the attachment portion of one of the plurality of electrical terminals when the wire dress cover is in the staged position.

5. The electrical connector assembly in accordance with claim 1, wherein the wire dress cover defines a push surface having a width at least equal to a portion of the connector housing to which the wire dress cover is slidably attached.

6. The electrical connector assembly in accordance with claim 1, wherein the wire dress cover defines a push surface having a width at least equal to a parallel portion of the connector housing.

7. The electrical connector assembly in accordance with claim 1, wherein the wire dress cover defines a push surface having a textured surface having a plurality of ribs arranged substantially parallel to one another.

8. The electrical connector assembly in accordance with claim 7, wherein the plurality of ribs extend in a direction substantially perpendicular to a direction of movement of the wire dress cover from the pre-staged position to the staged position.

9. A method of assembling an electrical connector having a wire dress cover, comprising:

inserting a plurality of electrical terminals within a plurality of terminal cavities of a connector housing, wherein each electrical terminal of the plurality of electrical terminals has a connection portion extending along a first axis and an attachment portion extending along a second axis substantially perpendicular to the first axis;

placing the wire dress cover in a pre-staged position; moving the wire dress cover in a direction substantially parallel to the second axis from the pre-staged position to a staged position, thereby inserting a locking feature defined by the wire dress cover between the attachment portions of the plurality of electrical terminals; and engaging a hook feature on a free end of a cantilevered beam on the wire dress cover with a corresponding hook feature on the connector housing to maintain the wire dress cover in the staged position and fully secured.

10. The method in accordance with claim 9, further comprising:

slidably attaching the wire dress cover to the connector housing.

11. The method in accordance with claim 9, wherein the wire dress cover is movable from the pre-staged position to the staged position when each of the plurality of electrical terminals is in a seated condition and wherein the wire dress cover is inhibited from moving from the pre-staged position to the staged position when one of the plurality of electrical terminals is in an unseated condition due to a mechanical interference condition between the locking feature and the attachment portion of one of the plurality of electrical terminals.

12. The method in accordance with claim 10, further comprising:

engaging a plurality of primary locking features defined by the connector housing with the plurality of electrical terminals to secure the plurality of electrical terminals within the plurality of terminal cavities in a fully seated condition, wherein the locking feature is a secondary locking feature.

13. The method in accordance with claim 9, wherein the locking feature defines a plurality of surfaces and wherein each surface is configured to engage the attachment portion of one of the plurality of electrical terminals when the wire dress cover is in the staged position.

14. The method in accordance with claim 9, further comprising contacting a push surface on the wire dress cover to move the wire dress cover from the pre-staged position to the staged position.

15. The method in accordance with claim 14, wherein the push surface has a width at least equal to a portion of the connector housing to which the wire dress cover is slidably attached.

16. The method in accordance with claim 14, wherein the push surface has a width at least equal to a parallel portion of the connector housing.

17. The method in accordance with claim 14, wherein the push surface has a textured surface having a plurality of ribs arranged substantially parallel to one another.

18. The method in accordance with claim 17, wherein the plurality of ribs extend in a direction substantially perpendicular to a direction of movement of the wire dress cover from the pre-staged position to the staged position.

* * * * *